United States Patent
Chauvel et al.

(10) Patent No.: US 7,496,930 B2
(45) Date of Patent: Feb. 24, 2009

(54) ACCESSING DEVICE DRIVER MEMORY IN PROGRAMMING LANGUAGE REPRESENTATION

(75) Inventors: Gerard Chauvel, Antibes (FR); Serge Lasserre, Frejus (FR); Dominique D'Inverno, Villeneuve Loubet (FR); Maija Kuusela, Mouans Sartoux (FR); Gilbert Cabillic, Brece (FR); Jean-Philippe Lesot, Etrelles (FR); Michel Banâtre, La Fresnais (FR); Jean-Paul Routeau, Thorigné-Fouillard (FR); Salam Majoul, Rennes (FR); Frédéric Parain, Rennes (FR)

(73) Assignee: Texas Instruments Incorporated, Dallas, TX (US)

( * ) Notice: Subject to any disclaimer, the term of this patent is extended or adjusted under 35 U.S.C. 154(b) by 682 days.

(21) Appl. No.: 10/831,575

(22) Filed: Apr. 22, 2004

(65) Prior Publication Data

US 2004/0261085 A1   Dec. 23, 2004

(30) Foreign Application Priority Data

Jun. 19, 2003   (EP) .................................. 03291505

(51) Int. Cl.
  *G06F 13/00*   (2006.01)
(52) U.S. Cl. ........................ 719/321; 711/202
(58) Field of Classification Search ................ 719/321; 711/202
  See application file for complete search history.

(56) References Cited

U.S. PATENT DOCUMENTS

| | | | |
|---|---|---|---|
| 5,261,077 A | 11/1993 | Duval et al. | |
| 5,680,161 A | 10/1997 | Lehman et al. | |
| 6,317,817 B1 | 11/2001 | Shichiku et al. | |
| 6,424,347 B1 | 7/2002 | Kwon | |
| 6,996,824 B2 * | 2/2006 | Sokolov | 719/315 |
| 7,159,223 B1 * | 1/2007 | Comeau | 719/310 |
| 7,213,098 B2 * | 5/2007 | Czajkowski et al. | 711/2 |

OTHER PUBLICATIONS

"Top Ten New Things You Can Do With NIO", Ron Hitchens, Internet Document, Online! Feb. 10, 2002, XP002284689. Retrieved from the Internet: retrieved on Jun. 9, 2002.

* cited by examiner

*Primary Examiner*—Andy Ho
(74) *Attorney, Agent, or Firm*—Ronald O. Neerings; Wade James Brady, III; Frederick J. Telecky, Jr.

(57) ABSTRACT

In some embodiments, a storage medium comprises application software that performs one or more operations and that directly manages a device. The application software comprises instructions that initialize an application data structure (e.g., an object or array) usable by the application software to manage the device and also comprises instructions that map the application data structure to a memory associated with the device without the use of a device driver. In other embodiments, a method comprises initializing an application data structure to manage a hardware device and mapping the application data structure to a memory associated with the hardware device without the use of a device driver. The application data structure may store a single dimensional data structure or a multi-dimensional data structure. In some embodiments, the device being managed by the application software may comprise a display and the application software may comprise Java code.

26 Claims, 7 Drawing Sheets

ACCESSING DEVICE DRIVER MEMORY IN PROGRAMMING LANGUAGE REPRESENTATION

BACKGROUND OF THE INVENTION

1. Technical Field of the Invention

The present invention relates generally to accessing device driver memory through a high level programming language.

2. Background Information

Many types of devices require device drivers for the operation of the device. Such devices may include displays and keyboards. A device driver is executable software that provides a programming interface between a high level programming language and the device. A device driver typically requires a portion of memory to be allocated for its use in providing data to or receiving data from the device it controls.

With regard to at least some high level languages (e.g., Java), such languages typically require a "call" to a device driver that may be written in a "native" language such as C. The high level application generally uses a data structure to provide data to, or receive data from, a corresponding data structure in the device driver memory. The two data structures may not be directly compatible and thus, a mapping between the two may be needed. Mapping a data structure from a high level language to the data structure in the device driver memory can be computationally intensive. Additionally, the calls that permit the context change between the high level application and the device driver undesirably introduce latency.

BRIEF SUMMARY

In some embodiments, a storage medium comprises application software that performs one or more operations and that directly manages a device. The application software comprises instructions that initialize an application data structure (e.g., an object or array) usable by the application software to manage the device and also comprises instructions that map the application data structure to a memory associated with the device without the use of a device driver. In other embodiments, a method comprises initializing an application data structure to manage a hardware device and mapping the application data structure to a memory associated with the hardware device without the use of a device driver. The application data structure may store a single dimensional data structure or a multi-dimensional data structure. In some embodiments, the device being managed by the application software may comprise a display and the application software may comprise Java code.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a software solution that directly manages a device through application software generally without the use of a device driver. Merely by way of example, the embodiments described herein are directed to a Java application that manages a display device, although the principles discussed herein have applicability apart from the Java language and display devices.

Figure 1:
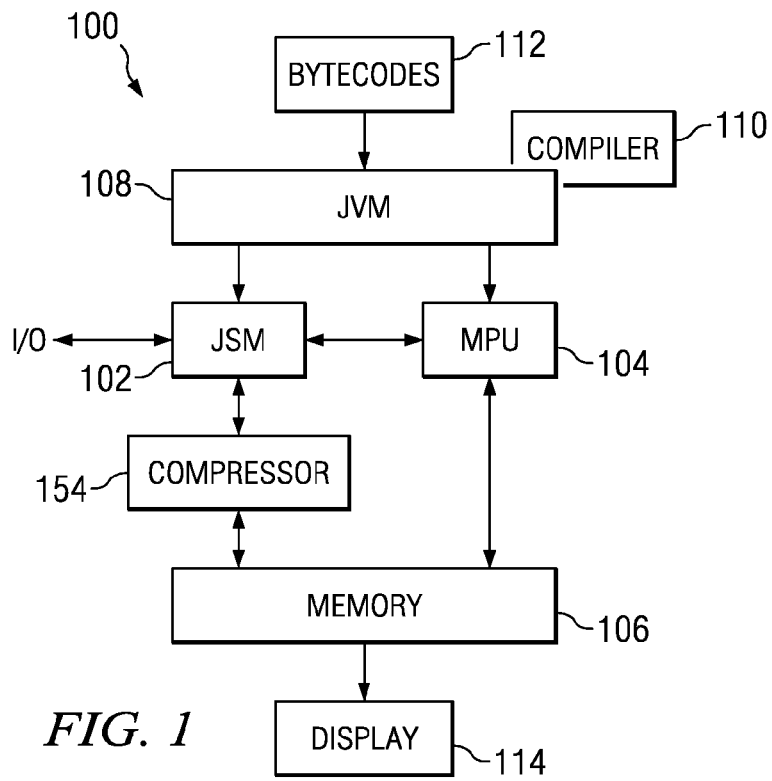
FIG. 1 shows a diagram of a system in accordance with preferred embodiments of the invention and including a compressor to permit a processor directly manage memory associated with a hardware device.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. A "compressor" 154 couples to the JSM 102 to the memory 106. The use of the compressor and associated software will be described in greater detail below.

Referring still to FIG. 1, system 100 also includes a java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. System 100 may be representative of, or adapted to, a wide variety of electronic systems, and an exemplary electronic system may comprise a battery-operated, mobile cell phone.

The Java code executed in system 100 comprises a plurality of "Bytecodes" 112. The Bytecodes 112 are provided to the JVM 108, compiled by compiler 110 and provided to the JSM 102 and/or MPU 104 for execution therein. The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

Figure 2:
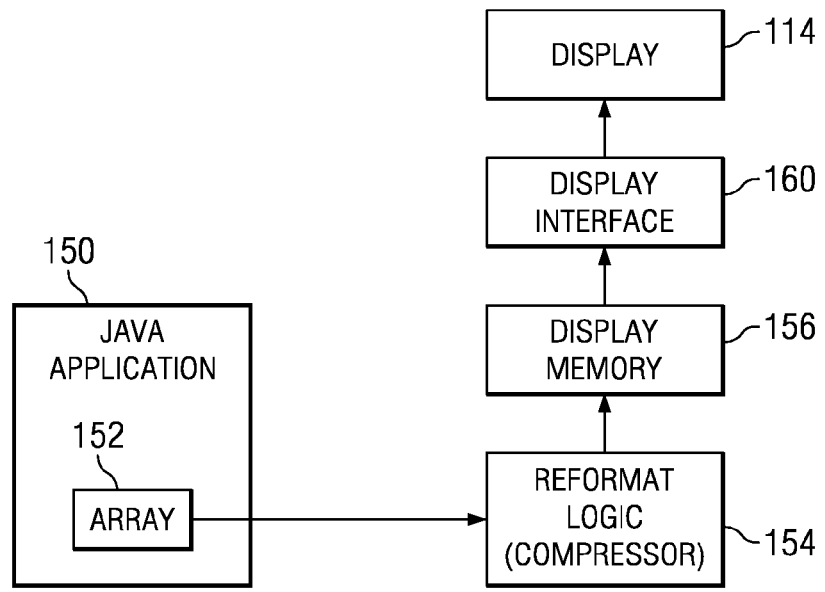
FIG. 2 further illustrates the system of FIG. 1.

FIG. 2 shows various components related to the management of the display 114. As shown, an application software 150 (e.g., Java application) includes an application data structure 152. The application data structure 152 may comprise any suitable type of structure such as an array or an object. The data structure 152 is described below as an array, but more broadly can be other types of structures. The application array 152 links to reformat logic 154 which, in turn, links to display memory 156. Display memory 156 may comprise a portion of memory 106 allocated for use by the display 114. More specifically, information to be shown on the display 114 preferably is stored in the display memory 156. A display interface 160 extracts display data from the display memory 156 and provides an appropriate electrical interface to cause the desired information to be shown correctly on the display 114.

As noted above, the software application 150 includes an application array 152. In general, a Java application may include more than one application array, but for purposes of explaining the preferred embodiments of the invention, the software application 150 includes at least one application array 152 usable for managing the display 114.

The application array 152 preferably is a Java array and thus comports with the applicable requirements of the Java programming language. For example, the array 152 may be an n-bit (or byte) addressable data structure. In Java, n is typically 32 bits meaning that array 152 is addressed in units of 32 bit (four byte) increments. The display memory 156, however, may be formatted differently than the Java array 152. For example, while the application array 152 may be an n-bit addressable data structure, the display memory 156 may comprise an m-bit addressable data structure where m is different than n. In some embodiments, for example, m could be 8, but m could also be any number of bits appropriate to the display color definition, while n may be 32 bits.

In accordance with a preferred embodiment of the invention, the Java application 150 accesses the display memory 156 through application array 152. The Java application 150 can cause text and/or graphics data ("display data") to be shown on display 114 by writing such display data to the application array 152. As noted above, the application array 152 is n-bit addressable and the display memory is m-bit addressable, where n may be different (e.g., greater) than m. Thus, the application array is formatted differently than the display memory. With n being different than m, the display data from the application array 152 cannot be copied directly into the display memory 156 without being re-formatted. When the data within the application array 152 is accessed (read or write) by the application software, the data is automatically reformatted into a format compatible with the display memory 156 when the data is written and from a display memory format to a format compatible with the application array on a read. The m dimension of display memory might or might not fit with the memory access granularity depending on the n/m ratio, causing a write within the display memory to be replaced by a read-modify-write by the reformat logic 154 when accesses to the compressed physical area are not aligned on memory access granularity. Because the process of reformatting the display data from the application array 152 comprises reducing a wider n-bit wide data value to a narrower m-bit wide data value, the reformat logic 154 is referred to as a "compressor," although this disclosure and claims are not limited to compressing data per se.

Figure 3:
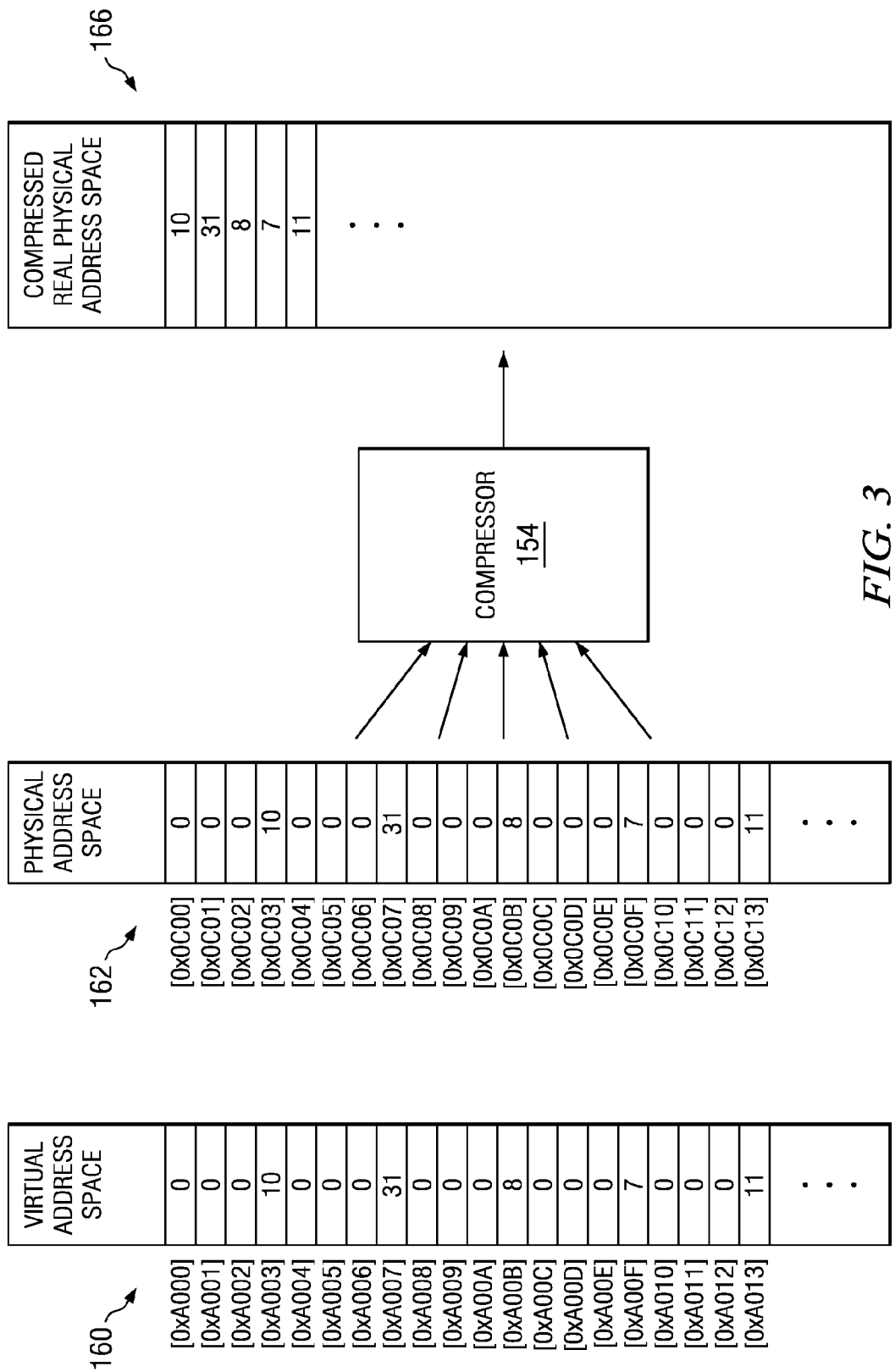
FIG. 3 illustrates the operation of the compressor to permit an application to manage the memory of the hardware device.

FIG. 3 further illustrates the functionality of the compressor 154. Virtual address space 160 associated with application array 152 includes display data from application 150 to be written to a compressed real physical address space 166 that is stored in display memory 156. In the example of FIG. 3, the virtual memory space 160 has a starting address of 0xA000 and is shown as being mapped onto a physical address space 162 that starts at address 0xC000. In the preferred embodiment, some or all of the physical address space 162 does not exist because the target real memory is the compressed memory space 166.

To enable the compression, the compressor 154 preferably maps the high level representation (32-bit-based memory block) in virtual address space 160 on to a low level representation (8-bit-based memory block) in compressed address space 166. The data content of the virtual address space 160 preferably does not exceed the low-level representation maximum value. For example, if the compressed address space 166 is 8-bits wide, then the virtual address space 160 associated with the application array 152 stores meaningful data in chunks of eight bits. As shown in FIG. 3, meaningful data chunks are shown at addresses 0xA003, 0xA007, 0xA00B, and so on, with the remaining portions of the address space (e.g., 0xA00-0xA003, 0xA004-0xA006, and so on) are set to a predetermined value of 0.

As discussed above, the preferred embodiments of the invention include the use of a Java application array 152 to be used as the Java representation of the device's memory mapped memory. An exemplary Java method is shown below in which the application array 152 is the array labeled "VGA." ("Video Graphics Adapter").

```
Class DisplayBitmap
{
    public int VGA [320x200];
    DisplayBit ()
    {
        //mapping the array on the device driver
        mapArrayOn(VGA, 0xC000)
    }
    void driverSetPixel(int X, int Y, int value)
    {
        VGA[X+Y*320] = value;
    }
}
```

In the method provided above, the Java array VGA is mapped on to the display memory at address 0xC000. To fully implement the mapping, an application programming interface ("API") is implemented that makes a mapping of the base of the array on an address. The method "mapArrayOn" is called the "constructor" of the object DisplayBitmap. The Java code may write a value of a pixel at a location X, Y in the display memory using the instruction VGA[X+Y*320].

Figure 4B:
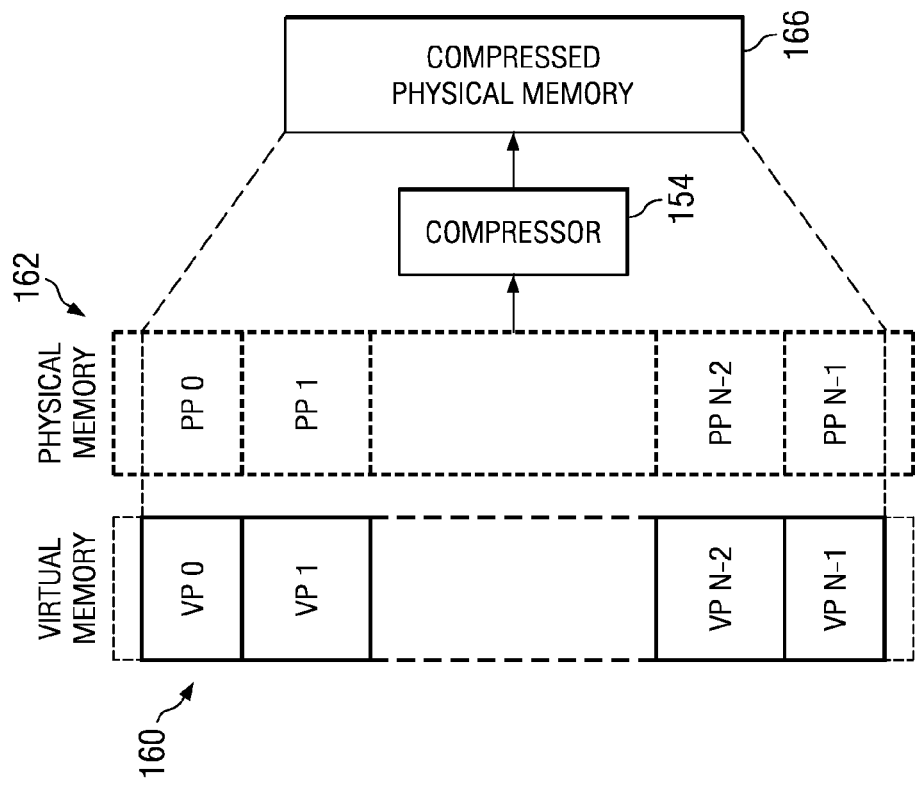
FIGS. 4A and 4B show various embodiments illustrating constraints on the system.
Figure 4A:
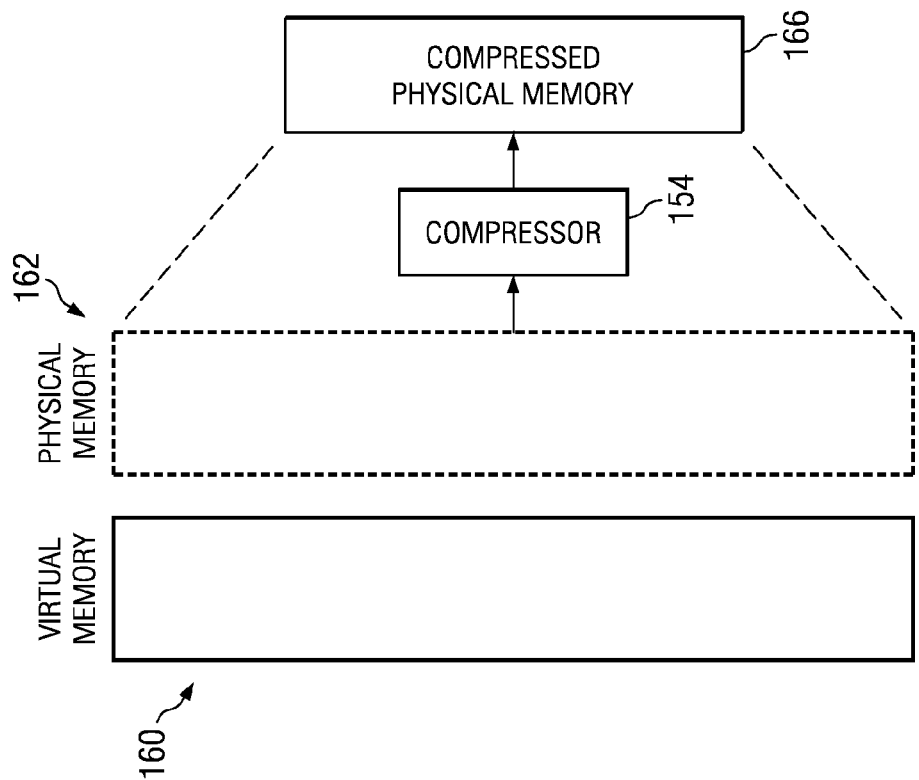

FIGS. 4A and 4B illustrate various constraints that may be applicable to the use of the compressor 154. In FIG. 4A, if the operating system running on the MPU 104 (FIG. 1) uses a flat (or linear) addressing mode or segmentation mode, the virtual memory space 160 associated with the application array 152 preferably comprises a contiguous virtual memory range. The contiguous virtual memory range 160 is viewed as being mapped on physical memory 162, but really the contiguous virtual memory range 160 is compressed on to compressed physical memory 166.

In FIG. 4B, if the operating system uses page-mode addressing, the virtual memory space 160 is divided into a plurality of individual virtual pages (VP 0, VP 1 . . . , VP N-1). In accordance with the operation of the compressor 154, the virtual memory space 160 for page-mode addressing comprises a contiguous virtual memory range as shown. The physical mapping of the virtual space pages is viewed as mapping the pages on to physical memory space 162, where physical pages PP 0 to PP N-1 are contiguous. The pages, in fact, are compressed on to compressed physical memory 166 (display memory). In general, no constraints are placed on the starting address of the compressed physical memory space 166. One or more software layers in the system are responsible for taking into account any memory holes if there is no existing memory at one or more addresses.

The compressor 154 includes multiple registers that hold one or more programmable values to translate a physical area into another compressed physical area. The programmable values are under the control of the JVM 108 and may comprise the starting address of the non-compressed memory area, the end address of the non-compressed area or its overall size, the starting address of the target display memory 156, the number of bits ("n") per element in the array in the application software and the number of bits ("m") per element in the compressed area or the equivalent ratio m/n. Other information such as the memory granularity access (e.g., 8 bits, 16 bits, 32 bits) may be included to manage unaligned write accesses. The compressor 154 facilitates the JVM 108 to efficiently access device memory mapped memories.

Figure 5:
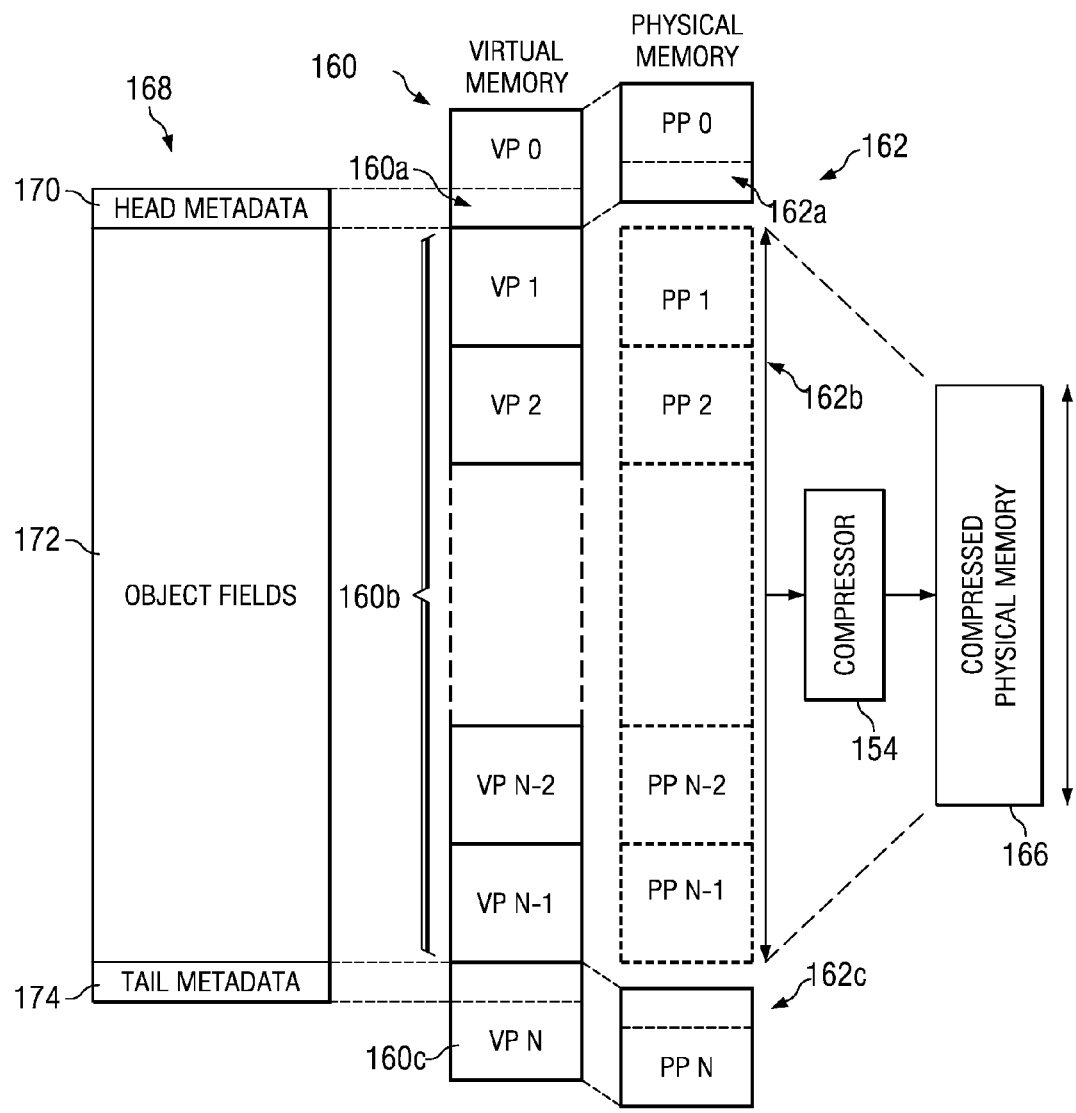
FIG. 5 illustrates the use of the system when the application software operates on objects that include metadata.

FIG. 5 illustrates how Java "metadata" is treated in a preferred embodiment in which the application array 152 is a single dimension array. Each object in Java includes metadata that may be used to manage the object. The metadata may include information such as object type, object size, and other object-specific parameters. As shown, an application array 152 comprises a data structure 168 that includes a "head" metadata 170, a tail metadata 174, and object fields 172. The head metadata 170 precedes the object fields 174 and the tail metadata 174 may follow the object fields 172. In the preferred embodiments, the metadata fields 170 and 174 are not compressed by compressor 154. That is, the compressor 154 preferably compresses the object fields 172, but not head and tail metadata fields 170 and 174.

Referring still to FIG. 5, if a flat or a segment addressing mode is implemented by the operating system and if head and/or tail metadata exists as in FIG. 5, the memory preceding (162a) and following (162c) the physical memory 162a that is compressed into physical memory 166 preferably exists for the process described herein to work in accordance with at least some embodiments.

In page mode addressing, head or tail metadata may be mapped onto separate pages 160a (VP 0), 160c (VP N) in the virtual address space 160. As such, head metadata 170, object fields 172, and tail metadata 174 are stored in contiguous virtual address blocks as shown in FIG. 5 while in the physical space, they may be mapped onto areas that are compressed (162b) and not compressed (162a, 162c). For this configuration, the frontier of the beginning and the ending of the compressible memory space preferably is page aligned. Some embodiment may have only metadata within a header.

Figure 6:
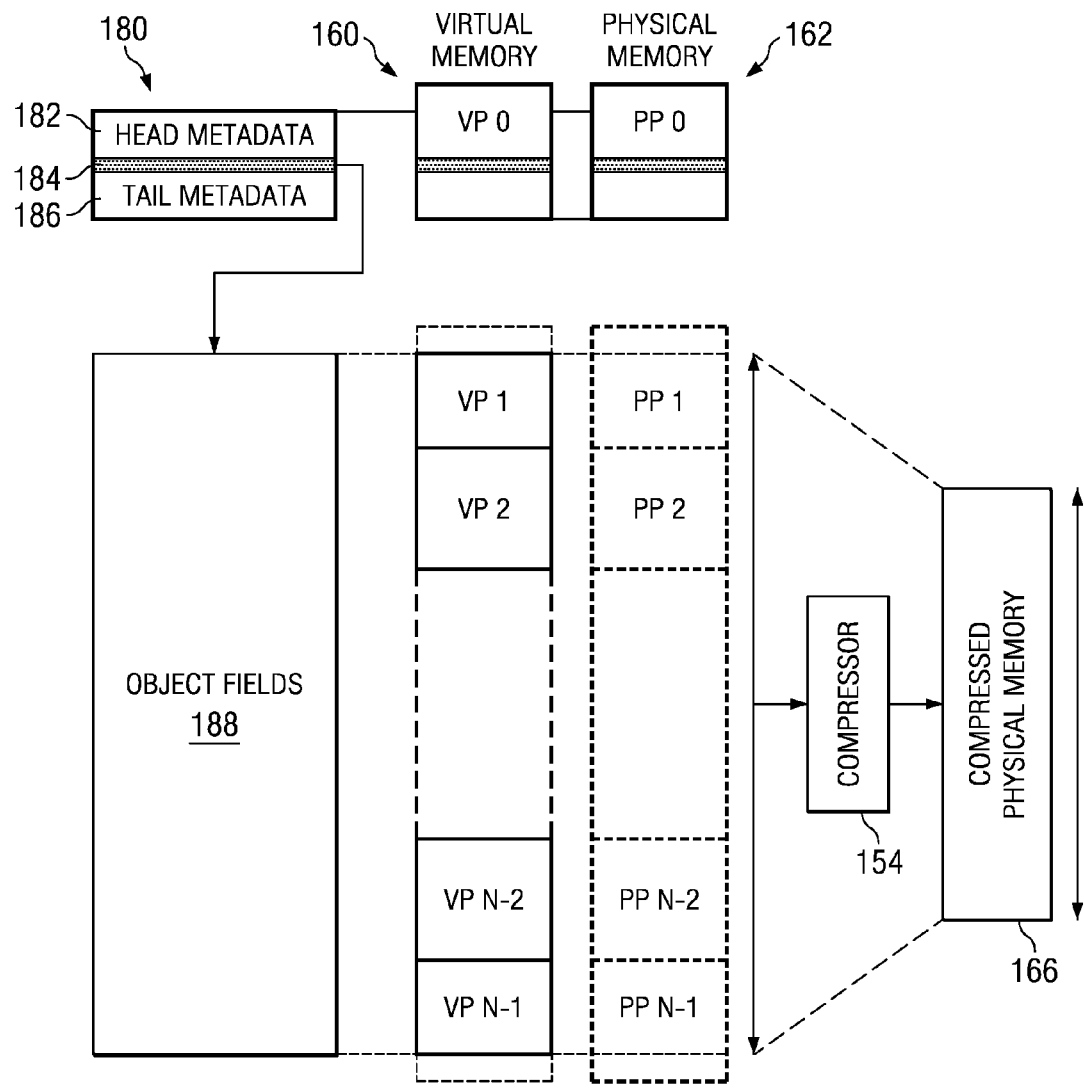
FIG. 6 illustrates the operation of the system operating on non-contiguous data structures.

Referring now to FIG. 6, shows another embodiment with a non-contiguous object configuration of a single dimension array is shown. Head metadata 182, pointer field 184, and tail metadata 186 preferably are contiguous in memory. The pointer field 184 includes a value (a "pointer") that points to object fields 188. A systematic indirection is used to access the object fields using the pointer 184.

In flat, segment or page mode addressing, no restriction exists as to the use of the preferred process described herein because the JVM 108 preferably uses two contiguous distinct memory spaces. Memory blocks 182, 184, and 186 are mapped inside a flat, a segment, or a page-based contiguous memory zone VP 0 and are not compressed when mapped to physical memory page PP 0. The object fields 188, however, are mapped using a flat, a segment or a page-based memory zone at VP1 through VP N-1 which, in turn are mapped on to compressed physical memory space 166 associated with the display memory 156. In this configuration, the physical memory preceding and following the compressed memory space 166 need not exist.

Figure 7:
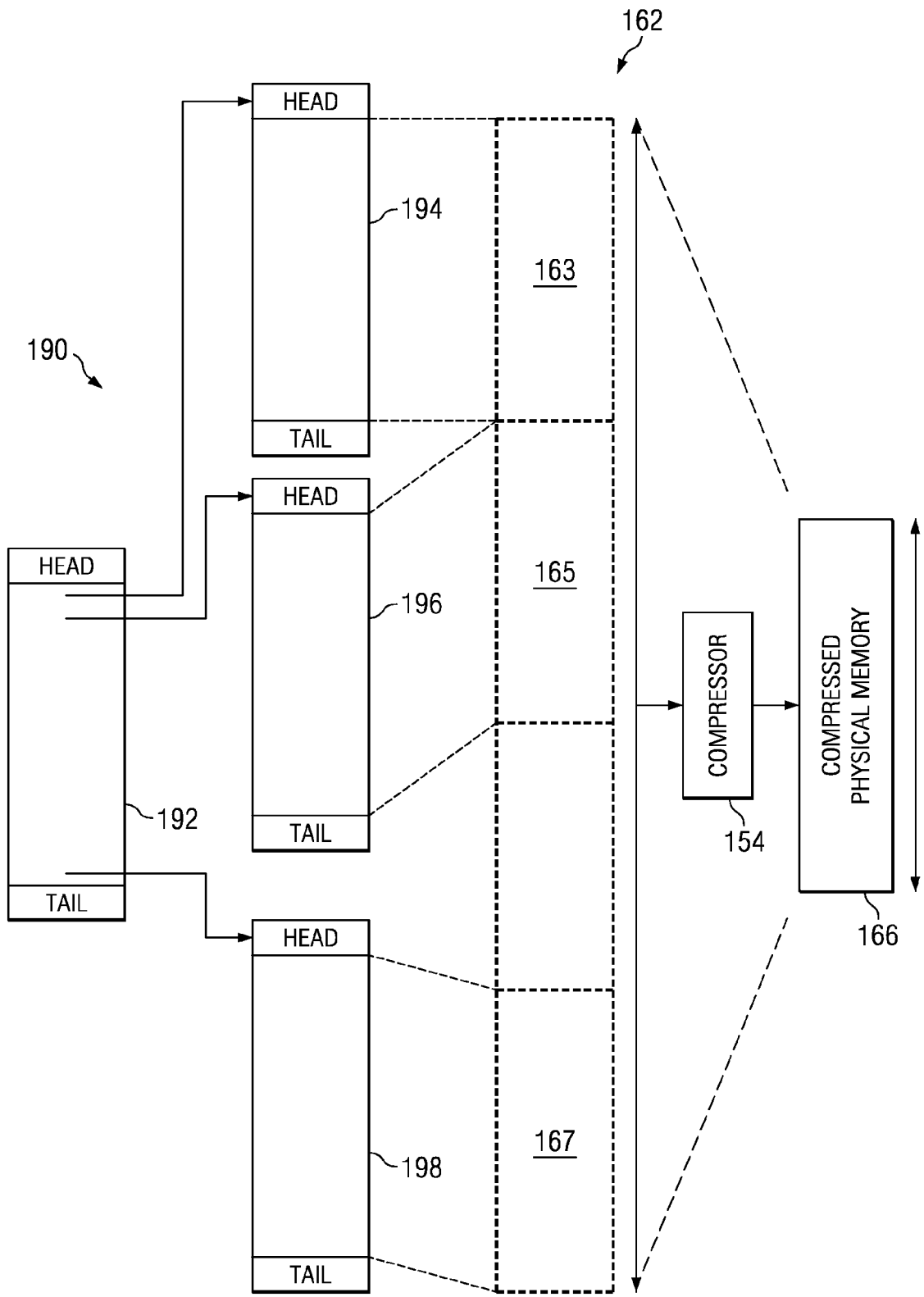
FIGS. 7 and 8 illustrate various embodiments of the system operating on multi-dimensional data structures.

Java permits the creation and use of multi-dimensional arrays. FIG. 7 depicts the use of application array 152 storing a multi-dimensional data structure 190. Virtual addressable blocks 192 comprise one dimension of the multi-dimensional data structure 190 and the second dimension comprises virtual addressable blocks 194, 196 and 198 as shown. Block 192 comprises pointers to blocks 194, 196 and 198. According to mapping constraints, in flat, segment or page-based addressing, all object fields representing the last dimension of the array (blocks 163, 165, and 167) are physically mapped on to contiguous compressed physical memory 166.

Figure 8:
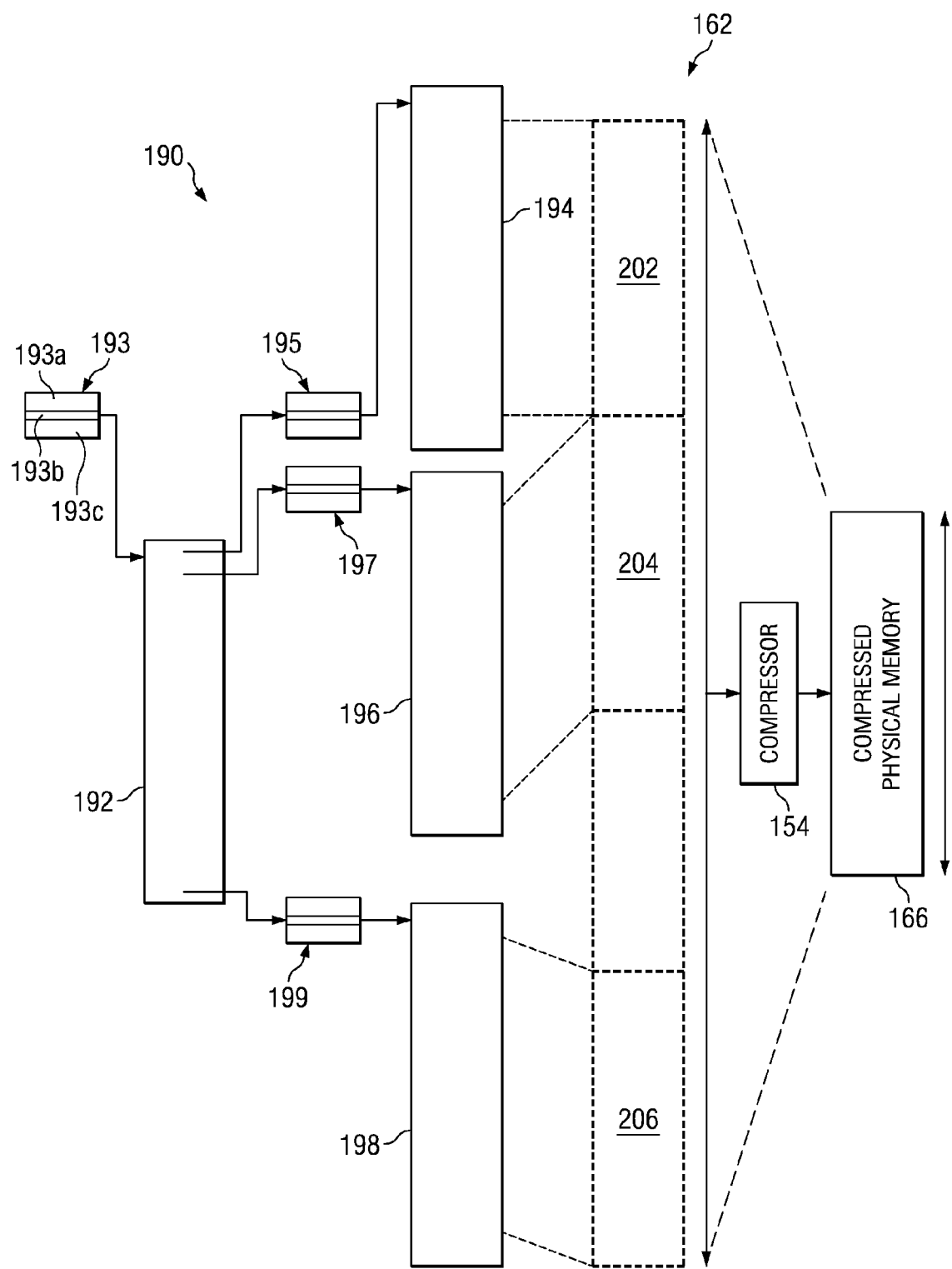

FIG. 8 represents a non-contiguous (as in FIG. 6) two-dimensional array 190 with one dimension comprising block 192 and the other dimension comprising blocks 194, 196, and 198. In this configuration of FIG. 8, all object fields representing the last dimension of the array (blocks 202, 204, and 206 are physically mapped on to compressed physical memory 166 (display memory) that is contiguous.

The preferred embodiments of the invention provides substantially benefits over other device management paradigms. For example, a high level language typically requires the use of calls to a display driver to cause information to be shown on a display. In the preferred embodiments, the MPU 104 need not be interrupted to run a native device driver. There are no function calls or interrupt service handlers to be used in the preferred embodiment. As a result, latency is reduced. Further, the calculation to translate the address within the display memory is performed by hardware rather than software.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A storage medium comprising application software that performs one or more operations and that directly manages a device, said application software comprising:
    instructions that initialize an application data structure usable by the application software to manage the device; and
    instructions that map at least a first portion of the application data structure to a memory associated with the device thereby avoiding the use of a device driver function call to access the device on behalf of the application software;

wherein the format of the first portion of the application data structure is different than the format of memory associated with the device.

2. The storage medium of claim 1 wherein the instructions that map are executed when the application software initializes the application data structure.

3. The storage medium of claim 1 wherein the application data structure comprises an application array.

4. The storage medium of claim 3 wherein the instructions that map the application array to a memory associated with the device comprise instructions that map the application array to a memory associated with a display.

5. The storage medium of claim 3 wherein the instructions that initialize the application array comprise instructions that initialize a Java array.

6. The storage medium of claim 3 wherein the instructions that initialize the application array comprise instructions that initialize a multi-dimensional Java array.

7. The storage medium of claim 3 wherein the instructions that initialize the application array comprise instructions that initialize a single-dimensional Java array.

8. The storage medium of claim 3 wherein the instructions that initialize the application array comprises instructions that initialize an application array comprising n-bit elements and the instructions that map the application array to a memory associated with the device comprises instructions that map the application array to memory comprising m-bit elements associated with the device, wherein m is different than n.

9. The storage medium of claim 8 wherein n is greater than m.

10. The storage medium of claim 3 wherein the application array comprises an object field and metadata and the instructions that map the application to a memory associated with the device comprises instructions that map the object field, but not the metadata, to the memory associated with the hardware device.

11. The storage medium of claim 10 wherein the metadata and object field are not stored in contiguous portions of the application array.

12. The storage medium of claim 1 wherein the application software comprises instructions that write data to the data structure thereby causing the data to be automatically reformatted into a form compatible with the memory associated with the device.

13. The storage medium of claim 1 wherein the application software comprises instructions that read data from the data structure thereby causing the data to be automatically reformatted from a format compatible with the memory associated with the device to a format compatible with the application data structure.

14. A method to access elements of a device directly from application software, comprising:
    initializing an application data structure usable by the application software to manage the device; and
    mapping at least a first portion of the application data structure to a memory associated with the device in order for the application software to access the memory, thereby avoiding the use of a device driver function call to access the memory associated with the device on behalf of the application software;
    wherein the format of the first portion of the application data structure is different than the format of memory associated with the device.

15. The method of claim 14 wherein mapping occurs while initializing.

16. The method of claim 14 wherein the application data structure comprises an application array.

17. The method of claim 16 wherein mapping the application array to a memory associated with the device comprises mapping the application array to a memory associated with a display.

18. The method of claim 16 wherein initializing the application array comprises initializing a Java array.

19. The method of claim 16 wherein initializing the application array comprises initializing a multi-dimensional Java array.

20. The method of claim 16 wherein initializing the application array comprises initializing a single-dimensional Java array.

21. The method of claim 16 wherein initializing the application array comprises initializing an application array comprising n-bit elements and mapping the application array to a memory associated with the device comprises mapping the application array to a memory comprising m-bit elements associated with the device, wherein m is different than n.

22. The method of claim 21 wherein n is greater than m.

23. The method of claim 16 wherein the application array comprises an object field and metadata and mapping the application to a memory associated with the device comprises mapping the object field, but not the metadata, to the memory associated with the hardware device.

24. The method of claim 23 wherein the metadata and object field are not stored in contiguous portions of the application array.

25. The method of claim 14 wherein the application software comprises instructions that write data to the data structure thereby causing the data to be dynamically reformatted into a form compatible with the memory associated with the device.

26. The method of claim 14 wherein the application software comprises instructions that read data from the data structure thereby causing the data to be dynamically reformatted from a format compatible with the memory associated with the device to a format compatible with the application data structure.

* * * * *